United States Patent
Chang et al.

(10) Patent No.: US 8,305,350 B2
(45) Date of Patent: Nov. 6, 2012

(54) TOUCH PANEL

(75) Inventors: Sean Chang, Taoyuan Hsien (TW); Yang-Lin Chen, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 875 days.

(21) Appl. No.: 12/110,004

(22) Filed: Apr. 25, 2008

(65) Prior Publication Data

US 2009/0188726 A1 Jul. 30, 2009

(30) Foreign Application Priority Data

Jan. 28, 2008 (TW) .................................. 97103050 A

(51) Int. Cl.
*G06F 3/41* (2006.01)

(52) U.S. Cl. .................. 345/173; 178/18.01; 178/19.01; 178/20.01

(58) Field of Classification Search .......... 345/173–179; 178/18.01–20.04

See application file for complete search history.

(56) References Cited

U.S. PATENT DOCUMENTS

| 2004/0012570 A1* | 1/2004 | Cross et al. ................... 345/173 |
| 2006/0017707 A1* | 1/2006 | Fukui et al. ................... 345/173 |

FOREIGN PATENT DOCUMENTS

| EP | 1 147 882 A2 | 10/2001 |
| EP | 1 850 216 A2 | 10/2007 |

* cited by examiner

*Primary Examiner* — Kevin M Nguyen
*Assistant Examiner* — Cory Almeida
(74) *Attorney, Agent, or Firm* — Muncy, Geissler, Olds & Lowe, PLLC

(57) ABSTRACT

A touch panel includes two transparent conductive films and at least one refractive index matching layer. The two transparent conductive films are disposed opposite to each other. The refractive index matching layer is disposed between the two transparent conductive films or disposed on one side of the transparent conductive film.

13 Claims, 4 Drawing Sheets

3

TOUCH PANEL

CROSS REFERENCE TO RELATED APPLICATIONS

This Non-provisional application claims priority under 35 U.S.C. §119(a) on Patent Application No(s). 097103050 filed in Taiwan, Republic of China on Jan. 28, 2008, the entire contents of which are hereby incorporated by reference.

BACKGROUND OF THE INVENTION

1. Field of Invention

The present invention relates to a touch panel and, in particular, to a touch panel with enhanced transmittance.

2. Related Art

Recently, touch panels have been widely applied to typical consumer electronic products such as a mobile communication, a digital camera, a digital music player (MP3), a personal digital assistant (PDA), a global positioning system (GPS), a hand-held personal computer (hand-held PC) or a novel ultra mobile personal computer (UMPC). In each of the above-mentioned electronic products, the touch panel is a touch screen combined with a display screen. However, the reflectance of the touch panel significantly influences the viewing quality for the user.

Referring to FIG. 1, a conventional touch panel 1 mainly includes two transparent conductive films 11A and 11B disposed opposite to each other. The transparent conductive films 11A and 11B are separated by a plurality of spacers 12 with an air layer 13 formed between the transparent conductive films 11A and 11B. In addition, the touch panel 1 further includes a glass substrate 14, a plastic substrate 15 and a hardened layer 16. The glass substrate 14 is disposed on one side of the transparent conductive film 11A, and the plastic substrate 15 and the hardened layer 16 are disposed on one side of the transparent conductive film 11B. In addition, a display screen (not shown) can be connected to the glass substrate 14 to form a touch screen together with the touch panel 1.

However, the typical material of the transparent conductive films 11A and 1B is indium tin oxide (ITO) having a refractive index of about 2. The air layer 13 has the refractive index of 1, and the difference between the refractive indices of the transparent conductive films 11A and 11B and the air layer 13 increases the reflectance and thus lower the transmittance. In addition, the difference between the refractive index of the outside air and the refractive indices of the glass substrate 14, the plastic substrate 15 and the hardened layer 16 also increases the reflectance. FIG. 2 shows the relationship between the reflectance of the touch panel 1 and the incident light wavelength. As shown in FIG. 2, the average reflectance of the touch panel 1 is about 20% and may reach as high as 40%. Consequently, both the transmittance and the contrast of the touch panel 1 are decreased and the display quality is thus influenced.

SUMMARY OF THE INVENTION

In view of the foregoing, an object of the present invention is to provide a touch panel having decreased reflectance so as to enhance the screen transmittance and contrast.

To achieve the above, the present invention discloses a touch panel including two transparent conductive films and at least one refractive index matching layer. The two transparent conductive films are disposed opposite to each other. The refractive index matching layer is disposed between the transparent conductive films.

In addition, the present invention also discloses a touch panel including a first transparent conductive film, a second transparent conductive film, at least one spacer, a transparent substrate and a refractive index matching layer. The first and second transparent conductive films are disposed opposite to each other and suspended by the spacer such that the first and second transparent conductive films are separated from each other. The transparent substrate is disposed on one side of the first transparent conductive film. The refractive index matching layer is disposed between the transparent substrate and the first transparent conductive film.

As mentioned above, the touch panel of the present invention has the refractive index matching layer disposed therein. The refractive index matching layer can reduce the difference between the refractive indices of the transparent conductive films and the refractive index of the air layer or between the refractive indices of the transparent conductive films and the refractive index of the transparent substrate. Thus, the present invention can enhance the transmittance and the contrast and thus the display quality.

BRIEF DESCRIPTION OF THE DRAWINGS

The present invention will become more fully understood from the subsequent detailed description and accompanying drawings, which are given by way of illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

First Embodiment

Figure 1:
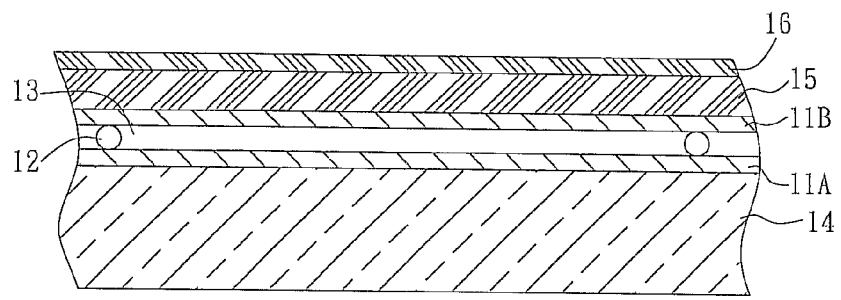
FIG. 1 is a schematic illustration showing a conventional touch panel.
Figure 2:
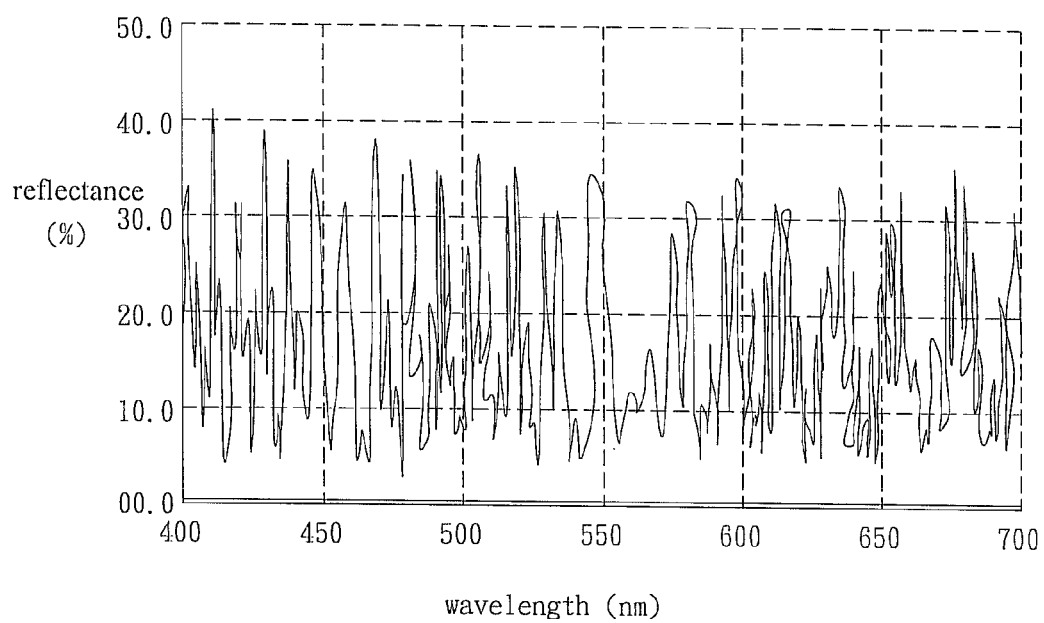
FIG. 2 shows the relationship between a reflectance of the touch panel of FIG. 1 and an incident light wavelength.
Figure 3:
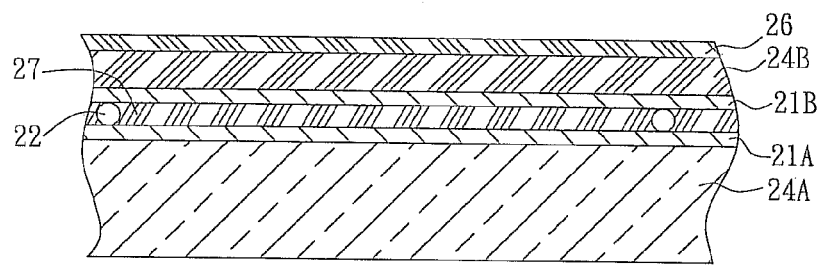
FIG. 3 is a schematic illustration showing a touch panel according to a first embodiment of the present invention.

FIG. 3 is a schematic illustration showing a touch panel 2 according to the first embodiment of the present invention. Referring to FIG. 3, the touch panel 2 includes two transparent conductive films 21A and 21B and a refractive index matching layer 27. The transparent conductive films 21A and 21B are disposed opposite to each other. The material of the transparent conductive films 21A and 21B includes, for example but not limited to, indium tin oxide (ITO), indium zinc oxide (IZO), aluminum zinc oxide (AZO), gallium zinc oxide (GZO), zinc oxide (ZnO), tin oxide ($SnO_2$) or combinations thereof.

The refractive index matching layer 27 is disposed between the transparent conductive films 21A and 21B, and is an elastic insulating layer for replacing the conventional air layer. The material of the refractive index matching layer 27 includes silicone, epoxy or combinations thereof. The refractive index matching layer 27 can also be a liquid refractive index matching layer, and is made of the material preferably including liquid silicone, liquid epoxy or combinations thereof. In addition, the refractive index matching layer 27 can be formed of a material with a single refractive index or formed of multiple materials with different refractive indices.

The refractive index of the refractive index matching layer 27 is smaller than that of each of the transparent conductive films 21A and 21B. For example, if the transparent conductive films 21A and 21B are made of indium tin oxide (ITO) having the refractive index of about 2, the refractive index of the refractive index matching layer 27 may range from 1 to 2 and preferably from 1.3 to 1.7. The above-mentioned design is to decrease the reflectance, which is caused by the differences between the refractive index of the middle air layer and the refractive indices of the transparent conductive films 21A and 21B.

In addition, the transparent conductive films 21A and 21B must contact with each other so that the touch panel can work. Thus, the refractive index matching layer 27 can serve as a buffer layer between the transparent conductive films 21A and 21B, so that the lifetime of the touch panel 2 is lengthened.

In this embodiment, the refractive index matching layer 27 further includes at least one spacer 22 disposed inside the refractive index matching layer 27. The transparent conductive films 21A and 21B are suspended by the spacer 22 to separate the transparent conductive films 21A and 21B from each other.

The touch panel 2 further includes a first transparent substrate 24A disposed on one side of the transparent conductive film 21A, and a second transparent substrate 24B disposed on one side of the transparent conductive film 21B. Each of the first and second transparent substrates 24A and 24B is a glass substrate or a plastic substrate. The plastic substrate can be made of polyethelyne (PE), polycarbonate (PC) or polyethylene terephthalate (PET). In addition, the second transparent substrate 24B can include a hardened layer 26 for protecting the touch panel 2.

Figure 4:
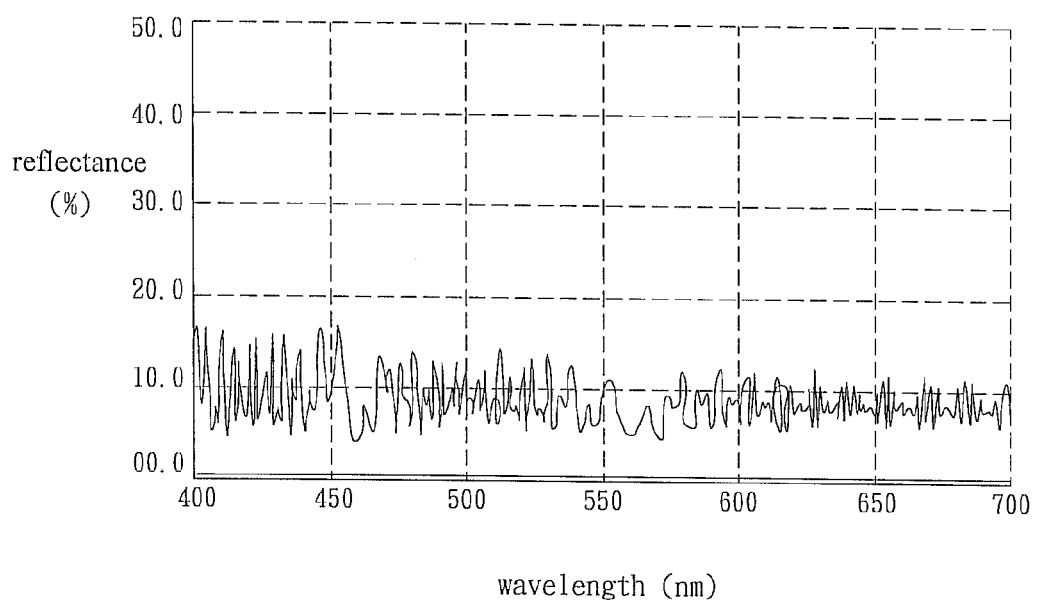
FIG. 4 shows the relationship between a reflectance of the touch panel of FIG. 3 and an incident light wavelength.

FIG. 4 shows the relationship between a reflectance of the touch panel 2 and an incident light wavelength. As shown in FIG. 4, the average reflectance of the touch panel 2 is about 10% and may reach the value smaller than 20%.

Second Embodiment

Figure 5:
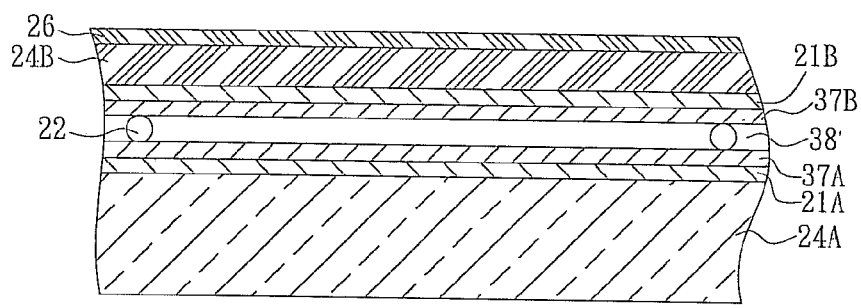
FIG. 5 is a schematic illustration showing a touch panel according to a second embodiment of the present invention.

Referring to FIG. 5, a touch panel 3 according to the second embodiment of the present invention includes two transparent conductive films 21A and 21B and two refractive index matching layers 37A and. 37B. The difference between the touch panel 3 and the touch panel 2 of the first embodiment is in that the refractive index matching layers 37A and 37B of the touch panel 3 are respectively disposed between the spacer 22 and the transparent conductive film 21A and between the spacer 22 and the transparent conductive film 21B. The refractive index matching layers 37A and 37B are suspended by the spacer 22, and therefore the refractive index matching layers 37A and 37B are separated from each other to form an air layer 38 therebetween. In addition, the refractive index matching layers 37A and 37B have the electroconductive property, and the material thereof may include a transparent conductive material or a material having lower refractive index and obtained by mixing the transparent conductive material with the transparent dielectric material. For example, the transparent conductive material can include indium tin oxide (ITO), indium zinc oxide (IZO), aluminum zinc oxide (AZO), gallium zinc oxide (GZO), zinc oxide (ZnO), tin oxide ($SnO_2$) or combinations thereof. The transparent dielectric material may be silicon dioxide, cryolite or magnesium fluoride ($MgF_2$). In the manufacturing process, the refractive index matching layer 37A and the first transparent conductive film 21A can be coated in one batch, and the refractive index matching layer 37B and the second transparent conductive film 21B can be coated in one batch.

Each of the refractive index matching layers 37A and 37B can be a single layer or a composite layer. When the refractive index matching layer 37A or 37B is a composite layer, many configurations can be adopted. For example, the first refractive index matching layer 37A or 37B is composed of alternately stacked high and low refractive index layers, wherein the refractive indices of a portion of the high refractive index layers may be greater than the refractive indices of the transparent conductive films 21A and 21B.

In addition, the air layer 38 may also be replaced with the refractive index matching layer 27 of the first embodiment. That is, the refractive index matching layer 27, such as elastic insulating layer or liquid refractive index matching layer, is formed between the refractive index matching layers 37A and 37B. Herein, the detailed descriptions of the property and the material of the refractive index matching layer 27 will be omitted.

Figure 6:
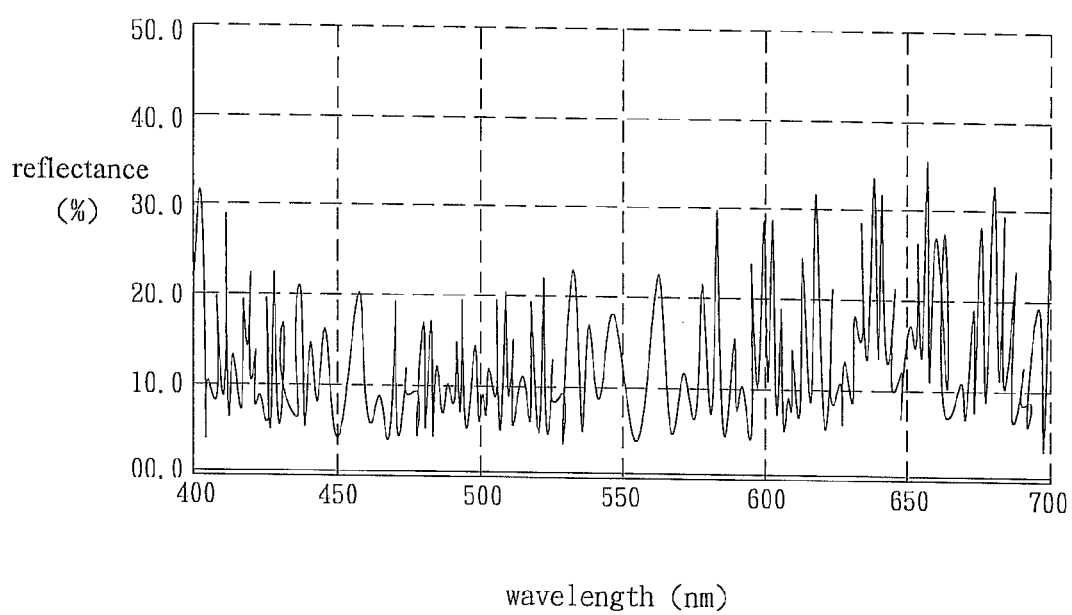
FIG. 6 shows the relationship between a reflectance of the touch panel of FIG. 5 and an incident light wavelength.

FIG. 6 shows the relationship between a reflectance of the touch panel of FIG. 5 and an incident light wavelength. As shown in FIG. 6, the average reflectance of the touch panel 3 is about 15%.

Third Embodiment

Figure 7:
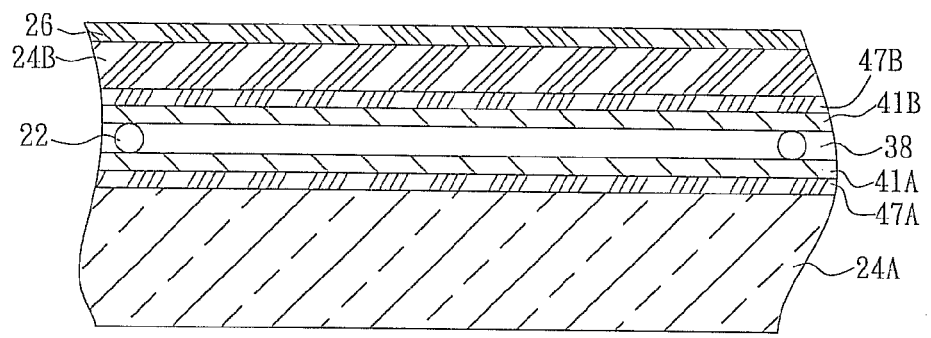
FIG. 7 is a schematic illustration showing a touch panel according to a third embodiment of the present invention.

As shown in FIG. 7, a touch panel 4 according to the third embodiment of the present invention is different from the tough panel 3 of the second embodiment in that the first transparent conductive film 41A and the second transparent conductive film 41B are suspended by the spacer 22 of the touch panel 4, and therefore the first transparent conductive film 41A is separated from the second transparent conductive film 41B. In the third embodiment, a refractive index matching layer 47A is disposed between the transparent substrate 24A and the first transparent conductive film 41A, and a refractive index matching layer 47B is disposed between the transparent substrate 24B and the second transparent conductive film 41B. In the manufacturing process, the refractive index matching layer 47A and the first transparent conductive film 41A can be coated on the transparent substrate 24A in one batch, and the refractive index matching layer 47B and the second transparent conductive film 41B can be coated on the transparent substrate 24B in one batch. Each of the refractive index matching layers 47A and 47B can be a single layer or a composite layer consisting of alternately stacked high and low refractive index layers. The material of each of the refractive index matching layers 47A and 47B includes, for example but not limited to, niobium oxide, titanium oxide, tantalum oxide, zirconium oxide, silicon oxide, magnesium oxide or combinations thereof.

When each of the refractive index matching layers 47A and 47B is a single layer, the refractive indices of the refractive index matching layers 47A and 47B respectively range between the refractive indices of the first transparent conductive film 41A and the transparent substrate 24A and between the refractive indices of the second transparent conductive film 41B and the transparent substrate 24B. In addition, when each of the refractive index matching layers 47A and 47B is a composite layer, many configurations can be adopted. For example, films having high and low refractive indices are arranged alternately. Herein, the refractive index of one portion of the materials of the refractive index matching layers 47A and 47B can be greater than the refractive index of each of the first and second transparent conductive films 41A and 41B or each of the transparent substrates 24A and 24B. The object of the above-mentioned design is to decrease the reflectance caused by the differences between the refractive indices of the first and second transparent conductive films 41A and 41B and the refractive indices of the transparent substrates 24A and 24B and the middle air layer 38.

In addition, the air layer 38 of the third embodiment may also be replaced by the refractive index matching layer 27 of the first embodiment. Herein, the detailed descriptions of the property and the material of the refractive index matching layer 27 will be omitted.

Figure 8:
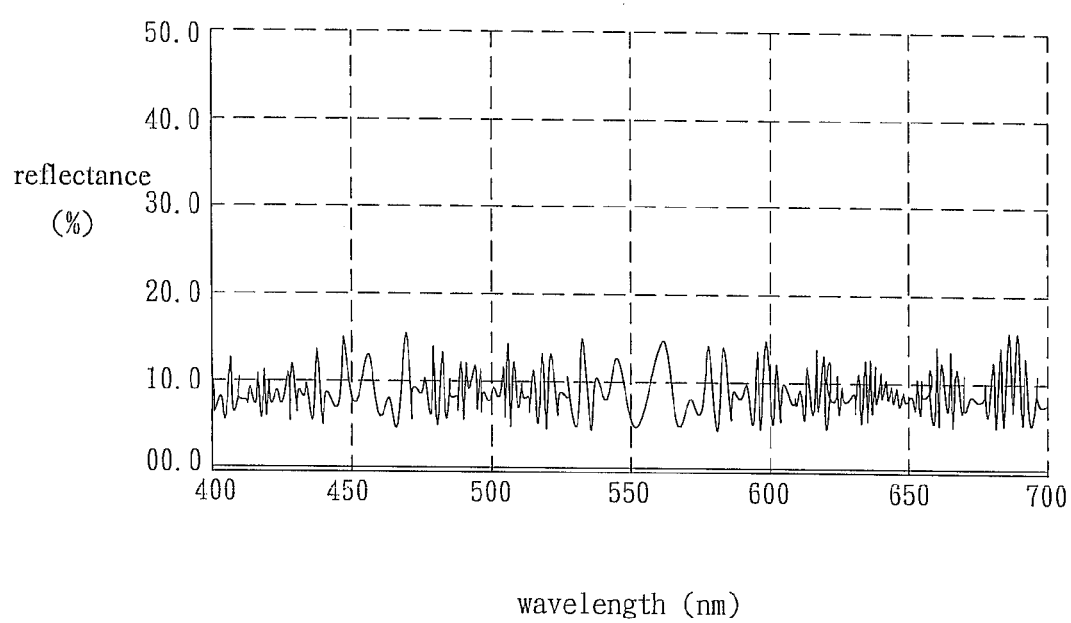
FIG. 8 shows the relationship between a reflectance of the touch panel of FIG. 7 and an incident light wavelength.

FIG. 8 shows the relationship between a reflectance of the touch panel of FIG. 7 and an incident light wavelength. As shown in FIG. 8, the average reflectance of the touch panel 4 is about 10% and can reach the value smaller than 20%.

In summary, the touch panel of the present invention has the refractive index matching layer disposed therein. The refractive index matching layer can serve as the refractive index buffer layer, so that the differences between the refractive indices of the transparent conductive films and the refractive index of the air layer or between the refractive indices of the transparent conductive films and the refractive index of the transparent substrate can be decreased. Thus, the present invention can enhance the transmittance and the contrast and thus the display quality.

Although the present invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the present invention.

What is claimed is:

1. A touch panel comprising:
   two transparent substrates disposed opposite to each other;
   two transparent conductive films respectively disposed on insides of the transparent substrates;
   two refractive index matching layers having electroconductive property and respectively disposed on insides of the transparent conductive films;
   an elastic insulating layer disposed between the refractive index matching layers; and
   at least one spacer disposed inside the elastic insulating layer and between the two refractive index matching layers to separate the two refractive index matching layers,
   wherein the refractive index matching layers and the elastic insulating layer each has a refractive index smaller than that of the transparent conductive films.

2. The touch panel according to claim 1, wherein a material of each transparent conductive film comprises indium tin oxide (ITO), indium zinc oxide, aluminum zinc oxide, gallium zinc oxide, zinc oxide, tin oxide or a combination thereof.

3. The touch panel according to claim 1, wherein each of the refractive index matching layers has a refractive index ranging from 1 to 2.

4. The touch panel according to claim 1, wherein each of the refractive index matching layers comprises materials with different refractive indices.

5. The touch panel according to claim 1, wherein a material of each refractive index matching layer comprises silicone, epoxy or a combination thereof.

6. The touch panel according to claim 1, wherein a material of each refractive index matching layer comprises a transparent conductive material, indium tin oxide (ITO), indium zinc oxide, aluminum zinc oxide, gallium zinc oxide, zinc oxide, tin oxide or combinations thereof.

7. The touch panel according to claim 6, wherein a material of each refractive index matching layer further comprises a transparent dielectric material, silicon dioxide, cryolite or magnesium fluoride.

8. The touch panel according to claim 1, wherein each of the refractive index matching layers is a single layer or a composite layer composed of alternately stacked high and low refractive index layers.

9. The touch panel according to claim 8, wherein a portion of materials of each refractive index matching layers has a refractive index greater than that of the transparent conductive films.

10. The touch panel according to claim 1, wherein each of the transparent substrates is a glass substrate, a plastic substrate, polyethelyne (PE), polycarbonate (PC) or polyethylene terephthalate (PET).

11. The touch panel according to claim 1, wherein a material of each refractive index matching layer comprises niobium oxide, titanium oxide, tantalum oxide, zirconium oxide, silicon oxide, magnesium oxide or combinations thereof.

12. The touch panel according to claim 1, wherein one of the transparent substrates has a hardened layer formed thereon.

13. The touch panel according to claim 1, wherein a material of the elastic insulating layer comprises silicone, epoxy or combinations thereof, and a refractive index of the elastic insulating layer ranges from 1.3 to 1.7.

* * * * *